ASYNCHRONOUS TIME-SHARING OF MULTI-CARRIER CHANNELS

Filed Dec. 6, 1966 5 Sheets-Sheet 1

INVENTOR
GAYLE R. NORBERG
BY Cushman, Darby & Cushman
ATTORNEYS

Dec. 23, 1969 G. R. NORBERG 3,485,953

ASYNCHRONOUS TIME-SHARING OF MULTI-CARRIER CHANNELS

Filed Dec. 6, 1966 5 Sheets-Sheet 2

INVENTOR
GAYLE R. NORBERG

By Cushman, Darby & Cushman
ATTORNEYS

INVENTOR
GAYLE R. NORBERG

BY Cushman, Darby & Cushman
ATTORNEYS

INVENTOR
GAYLE R. NORBERG
BY
Cushman, Darby & Cushman
ATTORNEYS

ASYNCHRONOUS TIME-SHARING OF MULTI-CARRIER CHANNELS

Filed Dec. 6, 1966

INVENTOR
GAYLE R. NORBERG
By Cushman, Darby & Cushman
ATTORNEYS

United States Patent Office 3,485,953
Patented Dec. 23, 1969

3,485,953
ASYNCHRONOUS TIME-SHARING OF MULTI-CARRIER CHANNELS
Gayle R. Norberg, Columbia Heights, Minn., assignor to Control Data Corporation, Minneapolis, Minn., a corporation of Minnesota
Filed Dec. 6, 1966, Ser. No. 600,693
Int. Cl. H04j 3/06
U.S. Cl. 179—15 10 Claims

ABSTRACT OF THE DISCLOSURE

A system for regulating communication between a central station and a plurality of remote stations over a single channel. Each remote station is provided with a control unit, the circuitry of which is interconnected with that of the remaining control units. The circuitry is logically arranged such that the response of one unit to a request from its associated station for access to the communication channel results in the acquisition of the channel coupled with the inhibiting of the operability of the remaining channels to secure access to the channel until the channel is free from prior selection. The circuitry also establishes priority among stations waiting to transmit.

This invention relates to shared communication channels having more than one conductor, cable, wire, or other carrier. More particularly, it concerns methods and apparatus for sharing time on such channels on a demand basis, where need for the channel may arise at any time in any one of a number of terminals sharing the channel in common. Each terminal is assumed to require the full capabilities of the channel for a short period of time.

Two broad categories of such sharing can be defined, synchronous and asynchronous. In the synchronous form, each terminal must wait its turn in a fixed sequence defined by a multiplexer which allots a brief period of channel usage to the terminal periodically. The asynchronous method, however, allots the channel to a terminal on a first come—first served basis, responding to a request for usage from any terminal, and resorting to sequenced operation only when two or more requests occur simultaneously. Existing asynhronous methods rely upon central sequential scanning of terminal activity to control channel usage.

If a parallel-signal communication channel is used to carry several randomly occurring transfers, some means must be found to keep the occurrences mutually exclusive. If this is done, the channel is more fully utilized, since it is effectively time-shared but retains the rapid-access characteristics of asynchronous operation. Certain parallel-signal channels, such as computer input-output, lend themselves to asynchronous sharing, the essence of efficient handling of random occurrences. Computer peripheral machines operate at different rates, producing sequential precession of their various data word transmissions in a random fashion. A large amount of circuitry can be saved by not synchronizing this essentially random process, as is commonly done.

When several terminals share a channel as discussed above, a means of associating the channel with a particular terminal is needed. In one known system, each terminal is assigned an action line which is activated when the terminal requires the channel. The action lines are scanned by the channel, and the lines thereby serve to identify the transmissions. Such a method is used in computer input-output channel scanners, the time-shared channel being that between the scanner and central storage. The scanner effectively synchronizes storage with demand, and the process might be called "action scanning." The input or output from a given terminal is generally stored in a contiguous block of memory and delivered sequentially to or from successive locations in that block. When many terminals of varying frequency of transmission share the channel, transmissions from each of them are interleaved in a constantly changing order. The action scanning, which defines a fixed sequence of procesing simultaneous requests, makes order out of this somewhat chaotic situation. It becomes evident, however, that in order to identify these interleaved transmissions, each active terminal requires the carrying, somewhere, of its current sequence information and a means of associating its transmission with that information.

In another known system, such as that utilized in computer action scanning, the sequence information is frequently carried in the so-called "control word," in one of a number of registers either in the computer or a channel controller, and each transmission is associated with its control word by the numbered position of the scanner when its request for action is recognized.

In the present invention, the terminal delivers to the system a tag number, or even the sequential address itself. The few extra wires and line drivers required to handle this tag number or address, epecially when used over the short distances in a computer complex, are cheaper than the cost of associating a control word with a scan stop. Other advantages are also realized. Combination encoding may be used, so the role of a given wire is generalized for use by many machines, lending flexibility to systems and uniformity to design. The larger the number of terminals, the greater the savings. The storage of a tag number at the remote terminal is not new in the art, but is important to the present invention. When the tag number is carried in the terminal, and delivered with a transmission, the device-identification role of the scanner is eliminated. If a means is found to prevent more than one terminal from occupying the channel at any instant, the scanner is not needed at all. In the method described below, the terminals *decide among themselves* which terminal should asynchronously occupy the channel, thus eliminating the scanner completely.

Accordingly, it is an object of this invention to provide a novel system of time-sharing a communication channel which operates asynchronously on demand from any terminal on the channel.

It is also an object of the invention to provide control of simultaneous demands for such a channel without the use of a cyclic scanner.

Another object is to provide an information channel occupancy control which favors some occupants over others only when more than one occupant needs the channel at once.

It is another object of this invention to define a novel and useful combination of control signals to control time sharing of a communications channel.

Another object is to reduce the number of carriers necessary for control of the channel.

Further objects and the entire scope of the invention will become more fully apparent when considered in light of the following detailed description of illustrative embodiments of this invention and from the appended claims.

The illustrative embodiments may be best understood by reference to the accompanying drawings, wherein.

Briefly, the invention comprises an interconnected logic system in which a plurality of control units, each associated with a Transmitter Terminal arranged for selective connection to a common communication channel, are connected in sequence by a control line. In one embodiment all units are connected in parallel to a second line indirectly feeding the sequential control line. In another embodiment, the output of the last unit in the sequence is connected to the input of the first unit in a type of recirculation arrangement. Each unit is provided with logic circuitry which is responsive to a control signal cn the control line and an external signal indicating that its associated Terminal desires channel access so as to generate an output signal which seizes the channel. The logic arrangement also provides that other waiting Terminals are inhibited from occupying the channel until it is free from the prior selection and the logic establishes a priority among waiting channels.

Figure 1:
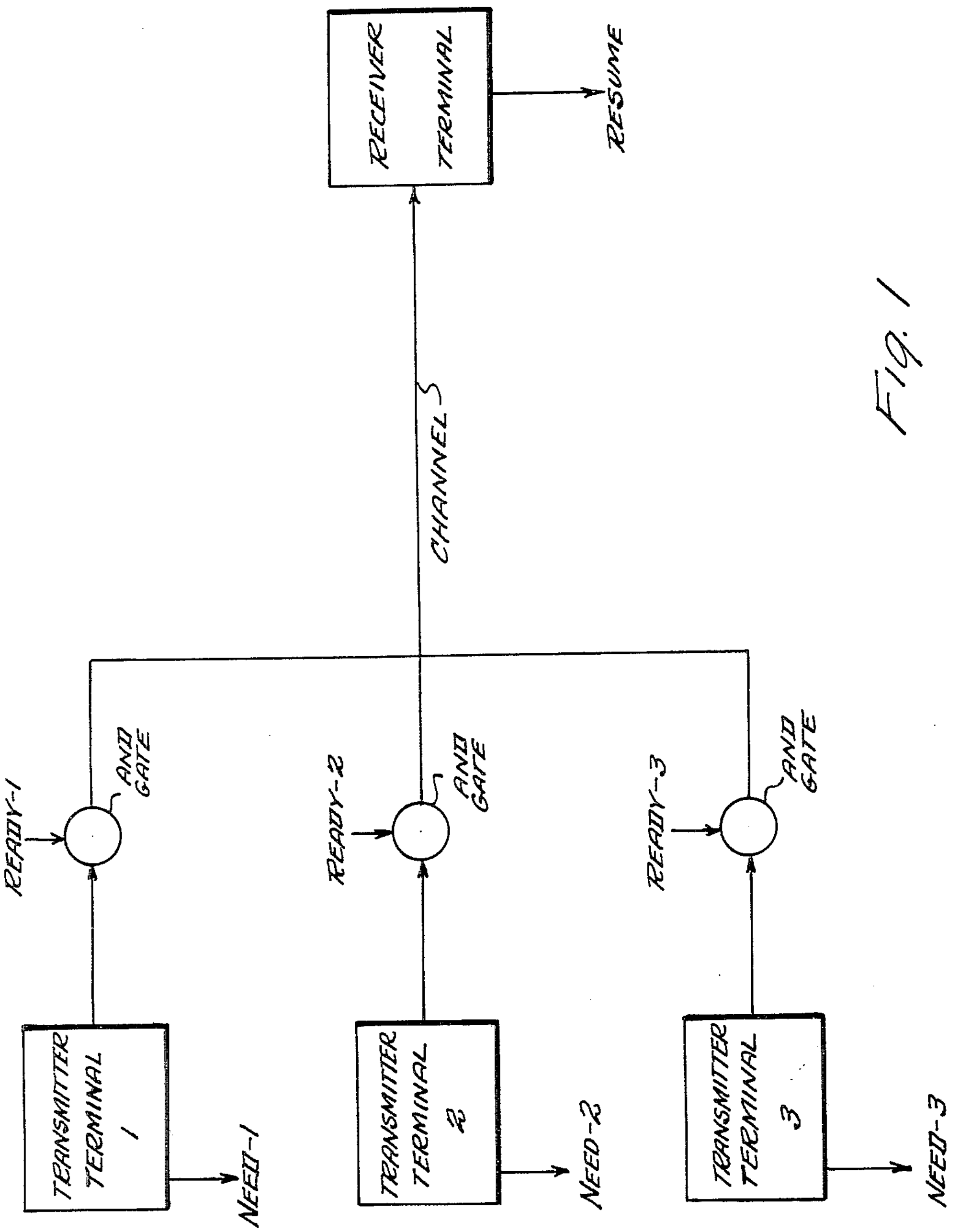
FIGURE 1 is a schematic block diagram of a communication system with which the invention could be utilized.

Referring now to the drawings, the invention will be described in detail. FIGURE 1 is a schematic block diagram which illustrates an overall system with which the present invention may be utilized. More particularly, three transmitting stations, Transmitter Terminals 1–3, are shown as being connected to a Receiver Terminal via a single channel which is to be time-shared asynchronously under the control of the various embodiments of the invention to be hereinafter discussed. As will be developed in detail later in this description, a signal indicative of the fact that a particular transmitting station desires to send a message is utilized by the channel control circuitry to develop a control signal which authorizes communication to proceed. Referring to FIGURE 1, there is illustrated for each Transmitter Terminal a NEED output, which is generated by conventional means, which output is present whenever the respective Transmitter Terminal is prepared to send a message. The NEED signal is utilized by the control circuitry to develop a READY signal which may be employed to condition an appropriate AND gate, thereby completing a path between the transmitting station awaiting permission to transmit and the Receiver Terminal. On completion of the transmission over the completed path, the Receiver Terminal, by conventional means, develops a RESUME signal which is applied to the control circuitry to condition the latter for further operation. The precise circuitry for generating READY signals will now be described with reference to the several embodiments of the invention illustrated in FIGURES 2–4.

Figure 2:
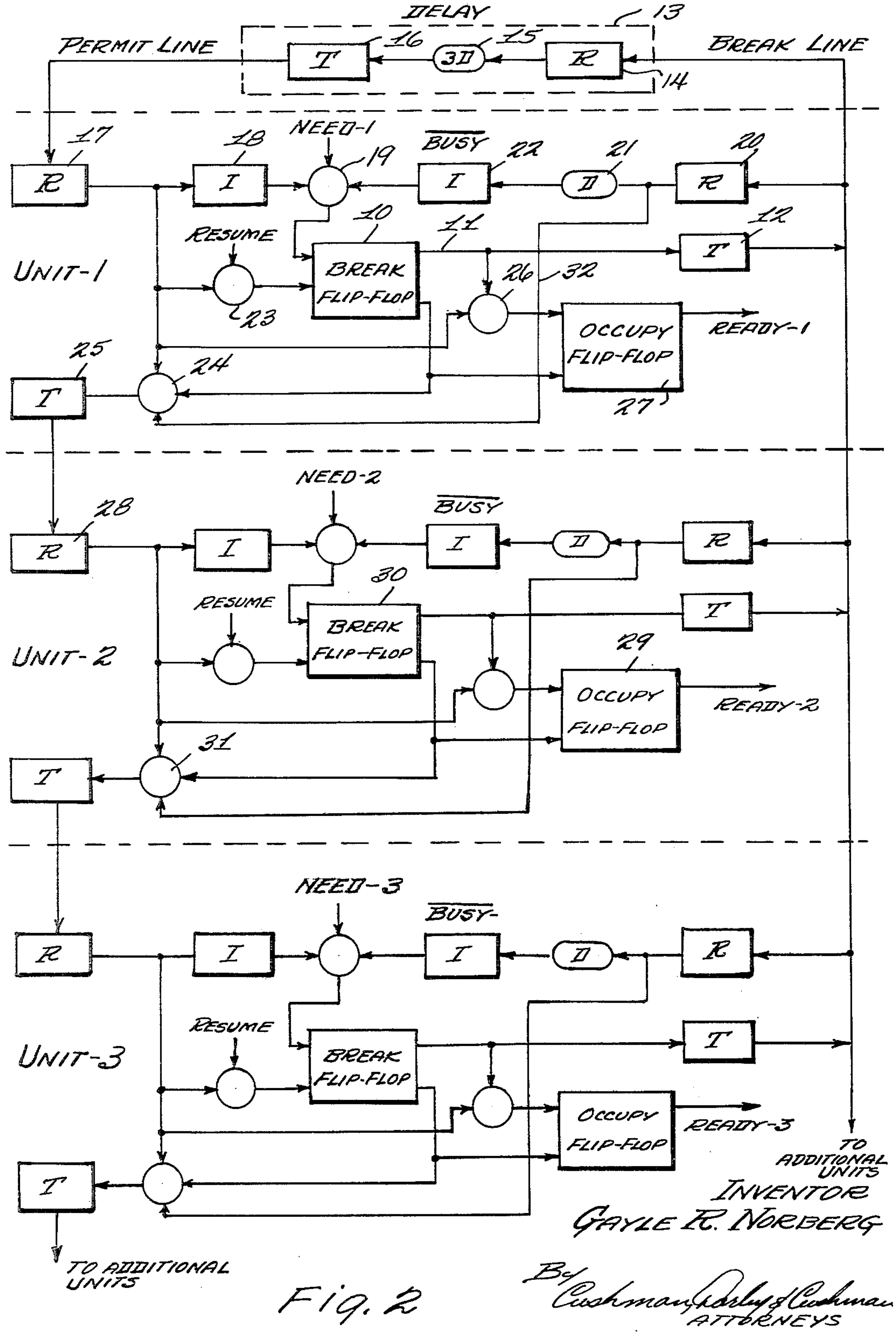
FIGURE 2 is a schematic block diagram of the logic arrangement of a first embodiment of the invention.

The first embodiment of the invention is shown in FIGURE 2 of the drawings. This embodiment is preferred for use in applications wherein moderate speed circuitry is employed. In this embodiment, three identical control units are illustrated, each unit being associated with a separate Transmitter Terminal such as those described with reference to FIGURE 1. It will be appreciated that these Terminals may be positioned at different locations and yet can share the same channel. Although only three units are illustrated in FIGURE 2, it should be understood that the arrangement may be appropriately expanded as required.

Considering now the details of the three unit structure of FIGURE 2, it can be seen that there is a first control line, called the Break Line, which is connected in common with all of the units. The Break Line performs a function similar to that of a telegrapher requesting use of a telegraph circuit which is constantly monitored by a Network Controlling Station. The telegrapher asks permission to use the line by sending a key signal identifying his station and the Network Controller calls him when the line is his. In a similar fashion, any Transmitter Terminal needing the channel develops a Break signal in the Break Line. It will be appreciated that since the Break Line is common to all units, any or all terminals can apply a Break signal to the Line at any time.

The condition of the Break Line is a function of the operation of a Break Flip-Flop in each unit. Since the three units are identical, reference will be made at this time only to Unit-1 to describe the structure of the control circuits. The SET output line of Break Flip-Flop 10 is coupled by a Transmitter Inverter 12 to the Break Line. The condition of the Break Line is coupled to the input of Unit-1 by a delay network 13 which includes a series arrangement of a Receiver Inverter 14, a delay element 15 and a Transmitter Inverter 16. The input to Unit-1 is applied to a Receiver Inverter 17. The output of Inverter 17 is coupled through a further Inverter 18 to one input of an AND gate 19. The Break Line is also coupled to a second input of AND gate 19 by a Receiver Inverter 20, delay element 21 and an Inverter 22, the latter being designated as the Not Busy Inverter. A third input to gate 19 is the NEED-1 output from the arrangement of FIGURE 1. The output of AND gate 19 is applied to the SET input line of Flip-Flop 10. The output or Inverter 17 is also coupled to an AND gate 23, to which the RESUME signal shown in FIGURE 1 is also joined as a second input. The output of gate 23 serves as the CLEAR input to the Break Flip-Flop 10. The outputs from Receiver Inverter 17, the CLEAR output line of Flip-Flop 10 and Receiver Inverter 20 are applied as separate inputs to AND gate 24, the output of which is coupled through a Transmitter Inverter 25 to Unit-2. The output of Receiver Inverter 17 and the SET output of Flip-lop 10 are applied as separate inputs to AND gate 26, the output of which serves as the SET input of Occupy Flip-Flop 27. The CLEAR input to this Flip-Flop is taken from the CLEAR output line of Flip-Flop 10. The READY-1 signal used in the arrangement of FIGURE 1 is the SET output of Flip-Flop 27.

In describing the operation of the foregoing structure, it will first be assumed that the circuitry is in its quiescent state. Since the several units are the same, only the condition of Unit-1 need be discussed in detail. Break Flip-Flop 10 is initially cleared. Therefore, the output on its SET output line 11 is a logical "0," which output is applied to the Transmitter Inverter 12 to produce a logical "1" output therefrom. This ouput is applied to delay network 13 to produce a logical "1" input to Receiver Inverter 17. The logical "0" output from Inverter 17 is changed by Inverter 18 to a logical "1," which partially conditions AND gate 19. The logical "1" on the Break Line is also passed through Receiver Inverter 20, delay element 21 and the NOT Busy Inverter 22 to produce a logical "1" therefrom which further partially conditions gate 19. However, since at this time there is no input on the NEED-1 Line from Transmitter Terminal 1, gate 19 is not fully conditioned. Therefore, the logical "0" at its output prevents the Break Flip-Flop 10 from setting. Similarly, the logical "0" output from Inverter 17 prevents AND gates 23 and 24 from being conditioned. Therefore, the Break Flip-Flop 10 remains cleared, and the output from Transmitter Inverter 25 to the circuitry associated with Unit-2 is a logical "1." Furthermore, AND gate 26 is not conditioned, so the Occupy Flip-Flop 27 remains in its initially cleared state. The READY-1 output on the SET output line of flip-flop 27 is therefore a logical "0."

Assuming now that Transmitter Terminal 1 requires the channel to transmit a message, a logical "1" is developed on the NEED-1 line from the Transmitter. This completes the conditioning of AND gate 19 thereby resulting in Break Flip-Flop 10 being SET. This in turn drives Transmitter Inverter 12 to cause a Break, a logical "0," on the Break Line. Receiver Inverter 20 senses the change and passes the signal through delay line 21 to the Not Busy Inverter 22. The output of Inverter 22 becomes a logical "0" thereby disabling further setting of Break Flip-Flop 10. It should be noted that a Break signal from any of the units thus causes the Not Busy Inverters of every unit to disable further setting of any of the Break Flip-Flops in the system.

When a Break signal is present on the Break Line, it is passed through delay network 13, and after a suitable delay, it is applied to Inverter 17 which changes the logical "0" to a logical "1." Since the output on SET line 11 of the Break Flip-Flop 10 is a "1," AND gate 26 is thereby conditioned to pass a logical "1" to the SET input line of Occupy Flip-Flop 27. As this Flip-Flop sets, a logical "1" is developed on its SET output line, or as it is otherwise referred to, the READY-1 line. This signal conditions the AND gate of FIGURE 1 to complete the communication path over the channel from Transmitter Terminal 1 to the Receiver Terminal.

On completion of transmission, a RESUME signal, a logical "1," is applied to complete the conditioning of AND gate 23 thereby passing a "1" to the CLEAR input line of the Break Flip-Flop 10. As Flip-Flop 10 clears, its SET output returns to a logical "0" thereby disabling AND gate 26 and causing a logical "1" to be developed at the output of transmitter inverter 12. Simultaneously, the CLEAR output line of Break Flip-Flop 10 applies a logical "1" to the CLEAR input line of Occupy flip-flop 27 thereby removing the logical "1" from the SET output line of Flip-Flop 27. Consequently, the path from Transmitter terminal 1 to the Receiver Terminal is interrupted.

So as to appreciate the interconnection between units, it will now be assumed that instead of Transmitter Terminal 1 requiring the channel, Transmitter terminal 2 is prepared to transmit. In this case, Unit-2 generates a Break signal in the same manner as already described with respect to Unit 1. The logical "0" Break signal is propogated through delay network 13 and is inverted to a logical "1" by receiver inverter 17. Therefore, AND gate 24 is partially conditioned. Since in this example Break Flip-Flop 10 is not SET, the logical "1" at its CLEAR output line further partially conditions gate 24. The logical "1" output of Receiver Inverter 20 completes the enabling of gate 24 to pass a "1" to Transmitter Inverter 25. The logical "0" output of Inverter 25 is applied to the Receiver Inverter 28 of Unit-2. This input to Unit-2 is processed, in the same manner as has been described hereinbefore with reference to Unit-1, to produce a logical "1" on the SET output line of Occupy Flip-Flop 29. This output permits the channel path to be completed between Transmitter Terminal 2 and the Receiver Terminal.

If two or more Break signals are simultaneously developed, the Break Flip-Flops of the corresponding Units will, of course, be SET, and a question arises as to which Transmitter Terminal is to receive control over the channel. To resolve such conflicts, the delay network 13 assumes significance. The chief function of the delay is to allow resolution of the final state of all Break Flip-Flops before the output from Transmitter Inverter 16 of the delay arrangement is permitted to pass to the units over a second control line which is designated as the Permit Line. This Permit Line includes the conductor from Inverter 16 to Receiver Inverter 17, from Inverter 17 through AND gate 24 to Transmitter Inverter 25, and thereafter through the corresponding Receiver and Transmitter Inverters and AND gates of the remaining units. The Permit Line is so named because a Terminal must receive a Permit to operate the channel from delay network 13, which can be considered analogous to the Network Controller on a telegraph line. The period of the delay network 13, as dictated substantially by delay element 15, is made somewhat longer than the delay of element 21 to insure that the Break Flip-Flops attain their final state. A delay ratio of 3 to 1 has been utilized successfully but other ratios are possible, the ratios being a function of the overall circuit parameters.

The Permit Line, as indicated previously, is threaded through each unit of the system, and each unit has the ability to either pass a signal on the Permit Line to the next unit, or to halt signal passage. This is evident from the example hereinbefore described wherein with Transmitter Terminal 2 seeking to transmit, the logical "0" from delay network 13 was passed along the Permit Line through Unit-1 to Unit-2. When Break Flip-Flop 30 of Unit-2 SET, the resultant "0" on the CLEAR output line of this flip-flop disabled AND gate 31 thereby halting the passage of the signal along the Permit Line.

It is apparent, therefore, that when a Break signal is generated by one or more units, a signal is passed along the Permit Line until it reaches the first unit in line which is in a Break condition. The signal remains statically on the Permit Line so long as any Break Flip-Flop remains SET. Thus, it can be seen that in the case of simultaneous generation of Break signals, a priority of access to the channel is created in favor of the first unit generating a Break signal which is reached by the Permit signal. However, when Break signals have been simultaneously generated, there can be no consecutive honoring of the Transmitter Terminal having highest priority since all Not Busy Inverters have a logical "0" output. Therefore, on termination of the message, the RESUME signal clears the Break Flip-Flop of the unit having priority, and the NEED signal cannot get through the disabled AND gate to reset this Flip-Flop. The permit signal then passes on through to the remaining terminals.

In the case where one unit develops a Break signal before other units do, the Transmitter Terminal associated with the first unit takes priority, and the additional Terminals desiring to transmit must wait until the selected Terminal has completed its transmission. This is due to the fact that when a Break signal is generated, the Not Busy Inverters produce logical "0"' outputs thereby disabling the AND gates in the path to the SET input lines of the Break Flip-Flops.

Considering a further aspect of the occurrence of simultaneous Break signals, the Terminals associated with the units generating the simultaneous Break signals must be honored before any other Terminal in the system which may subsequently desired to transmit can be recognized. This is again due to the fact that the outputs of the Not Busy Inverters prevent any other Break Flip-Flops from being SET. Therefore, if for example there are nine Transmitter Terminals in the system and the corresponding Units 2, 4 and 5 generate Break Signals simultaneously, or within the delay period of the elements corresponding to 21 of Unit 1, and Transmitter Terminals 1, 3 and 9 become ready to transmit at various times before transmission on Terminals 2, 4 and 5 is completed, the Transmitters will occupy the channel in the order: 2, 4, 5, 1, 3 and 9. So priorities exist only when there are substantially simultaneous demands, and then only if all demands in an earlier occurring group are processed, regardless of the priority relationships between the groups.

The priority of the foregoing system can b changed slightly by removing from each unit elements corresponding to Inverters 20 and 22 and delay line 21. In this situation, Break signals can be generated by individual units at any time a Permit signal is not applied to such units. It is possible then for one unit to intrude ahead of a previously requesting unit so long as a Permit signal has not passed the unit. Utilizing the units of the preceding example, if Units 2, 4 and 5 generate Break signals, followed by further requests on Units 1, 3 and 9 before Unit 2 releases, the access order will be: 2, 3, 4, 5, 9 and 1.

A further feature of the present embodiment which should be considered is the arrangement for insuring that two or more Terminals do not simultaneously occupy the channel. Clearing the last active Break Flip-Flop of course removes the Permit signal, as well as conditioning the Not Busy Inverters to indicate that no Terminals are transmitting. However, in large systems having many Terminals or long propagation delays in the Permit Line, it is possible that a Terminal will occupy the channel on the strength of a Permit "left over" from a previous Break unless measures are taken to prevent it. This could result in a plurality of Transmitter Terminals occupying the channel simultaneously. In each unit an inverter such as 18 is included to prevent this problem. No new Break signal can be generated by any unit until the Permit signal from previous Breaks has been removed. Until the Permit signal passes, Inverter 18 inhibits its associated AND gate 19 from setting the Break Flip Flop in that Unit. Therefore, no new Break signal can be generated. Line 32 from the Receiver Inverter 20 of each unit to each AND gate 24 also helps dissipate "left-over" Permit signals since each Terminal will prevent propagation of Permit signals whenever the Break Line is not busy.

Figure 3:
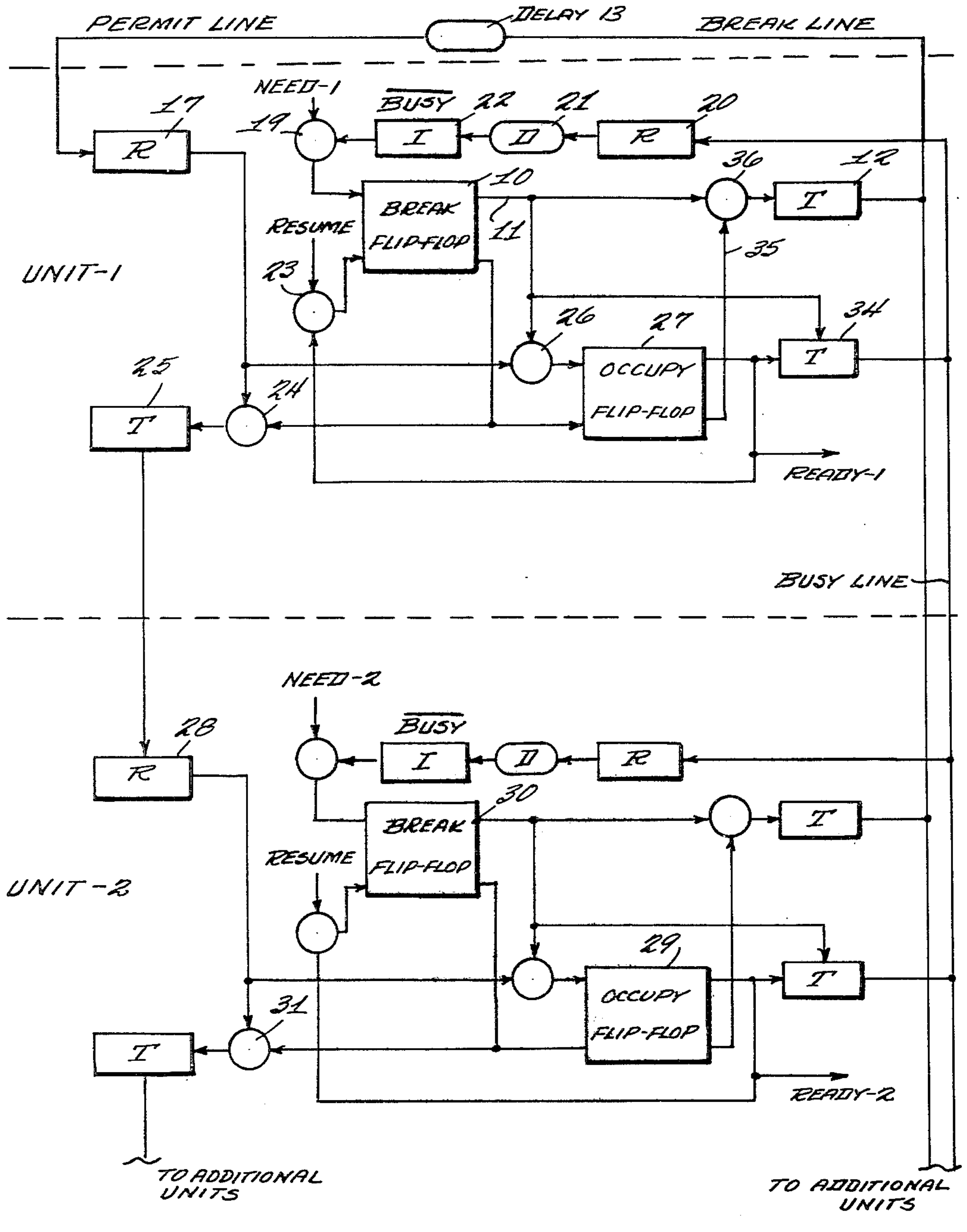
FIGURE 3 is a schematic block diagram of the logic arrangement of a second embodiment of the invention.

A second embodiment of the invention is illustrated in FIGURE 3 of the drawings. This embodiment is very similar to that illustrated in FIGURE 2. However, the differences render the second embodiment particularly adaptable for use in very high speed applications. In the following description of the structure of FIGURE 3, labeling and numbering conventions will follow those of FIGURE 2 as closely as possible.

A principal distinction of this second embodiment is the addition of a third control line, which is called the Busy Line. Instead of being connected to the Break Line, the Not Busy Inverter 22 of each unit, and its associated circuitry including elements 20 and 21, are joined to the Busy Line. The Busy Line is driven in each unit by additional Transmitter Inverters 34 which are connected between the SET output lines of the Occupy Flip-Flops and the Busy Line. The SET output of each Break Flip-Flop 10 is also connected as an input to a respective Transmitter Inverter 34. Inverters 34 are of the type which produce a logical "1" output only when logical "0" inputs are applied to all inverter inputs. This type of device is also called a "NAND" gate. Therefore, it will be appreciated that if either of the Break or Occupy Flip-Flop is SET, the corresponding Transmitter Inverter 34 will produce a BUSY signal on the Busy Line.

A further modification is the addition of a Break Disable Line 35 from the CLEAR output of each Occupy Flip-Flop to a new AND gate 36 at the input of Transmitter Inverter 12. This arrangement provides that as soon as a unit is given occupancy of the channel, it removes its Break signal from the Break Line. If this is the only current Break signal, the Permit will then have the entire period of occupancy to die out. The Busy Line remains active, however, since Inverter 34 is driven by the SET outputs of Break Flip-Flop 10 and the Occupy Flip-Flop thereby preventing other units from Breaking.

It should be noted that in the present embodiment, the inverters 18 and line 32 of FIGURE 2 have no counterpart in the circuit. This is because early removal of the Break signal allows Permit signals to dissipate before they can cause problems in following Breaks. Therefore, these components become unnecessary. Also, in this embodiment AND gate 23 is not conditioned by the Permit signal, as in FIGURE 2, but instead by the SET output of the Occupy Flip-Flop for the unit. This is necessary since if the unit is the only Breaking one, the only existing Break signal is terminated when AND gate 36 is disabled due to the setting of the Occupy Flip-Flop which causes the CLEAR output of the Occupy Flip-Flop. Thus, with the Occupy Flip-Flop which is an input to gate 36, to become a logical "0." SET, the Permit Line goes inactive and the Break Flip-Flop could never be CLEARED by the channel RESUME signal if the conditioning of AND gate 23 were dependent on the Permit signal, as in the FIGURE 2 embodiment.

The foregoing detailed comments concerning the modification of the first embodiment, when taken in light of the lengthy description hereinbefore of the first embodiment, makes a presentation of the complete operation of the FIGURE 3 embodiment unnecessary. Such a discussion would be repetitious. However, further comments concerning the effect of the modifications on the overall operation of the second embodiment will now be presented for facilitating the understanding of this embodiment of the invention.

It should be noted that for convenience of presentation, only two units are illustrated in FIGURE 3. However, additional units could be added.

The operation of the circuit of FIGURE 3 is made clear by examining the purpose of the Busy Line. This Line effectively separates the Busy function from the Break Line, allowing removal of the Break signal as soon as permission to occupy the channel is received. Therefore, the entire period of occupancy of the channel by any unit is available to let the trailing edge of the Permit signal reach AND gate 24 and thus be dissipated. Occupancy period is usually ample for this purpose, even when circuitry is used which is so fast that the propagation time of signals down interconnecting cables becomes a significant factor in system operation. An inverter corresponding to Inverter 18 of FIGURE 2, and an equivalent of line 32, are not necessary to allow for "leftover" Permits, since there are none. Typical situations where the removal of the Break signal will cause the Permit Line to go inactive are when the Breaking unit is the only one Breaking at the time of occupancy, or when the last unit of a series of units which broke simultaneously or within the delay period of the elements corresponding to 21 of Unit 1, receives a Permit signal. Of course, the Permit will remain active and proceed from one Unit to the next, as in the system of FIGURE 2, until the last such Breaking unit is serviced. Since the Busy Line remains with a logical "0" until the Occupy Flip-Flop is cleared, the priority and queuing characteristics of the circuit of FIGURE 2 are preserved. The circuit is capable of much faster operation than that of FIGURE 2, because faster circuit elements can be used without encountering problems with the trailing edge of the Permit signal. This circuit could therefore also accommodate more units before delays encountered in propagating the control signals between units place an upper limit on speed of operation. For the same reason, in a small system requiring short occupancy periods, the circuit of FIGURE 3 would be advantageous.

Figure 4:
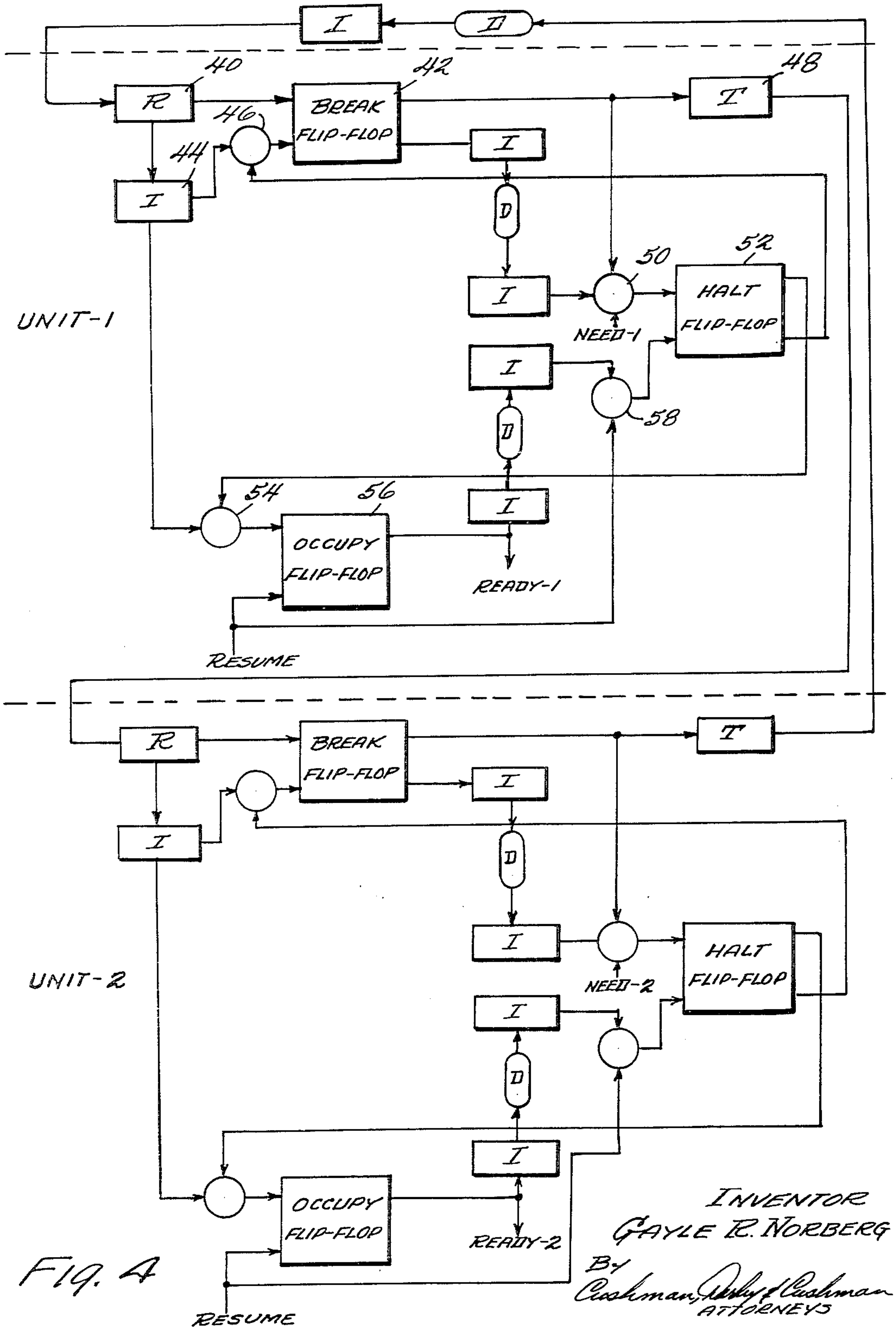
FIGURE 4 is a schematic block diagram of the logic arrangement of a third embodiment of the invention.

A third embodiment of the invention is illustrated in FIGURE 4 of the drawings. Although the broad functional characteristics of this embodiment are similar to those of the two previously described structures, the logical arrangement is significantly dissimilar so as to require a detailed explanation. Again, a number of identical units are interconnected, each unit having control capability for selectively completing a path over a time-shared channel. Each unit comprises a Receiver Inverter 40, the output of which is connected to the SET input line of a Break Flip-Flop 42. The output from Inverter 40 is also supplied as an input to an additional Inverter 44. The output from Inverter 44 is joined to the input of an AND gate 46 the output of which is connected to the CLEAR input line of Flip-Flop 42. The SET output line of the Break Flip-Flop is connected through a Transmitter Inverter 48 to the input of a receiver in Unit-2, corresponding to Receiver Inverter 40. The SET output from Flip-Flop 42 also is applied as a gating input to AND gate 50, the output of which is connected to the SET input line of Halt Flip-Flop 52. The CLEAR output line of Flip-Flop 42 is coupled through a double inversion and delay circuit to a second input to AND gate 50. The final input to gate 50 is the NEED signal which is generated when the corresponding Transmitter Terminal is ready to transmit. The SET output line of Halt Flip-Flop 52 is connected as an input to an AND gate 54, to which the output of Inverter 44 is also applied. AND gate 54 is interposed in the path to the SET input line of Occupy Flip-Flop 56. As in the prior embodiments, the SET output line from the Occupy Flip-Flop is utilized to control the occupancy of the channel. The SET output from Flip-Flop 56 is also directed through a double inversion and delay arrangement to one input of a further AND gate 58 to which the RESUME signal is also applied as a second input. The output of gate 58 serves as the CLEAR input to Halt Flip-Flop 52. The CLEAR output from flip-flop 52 is supplied as an input to AND gate 46, which in turn has its output connected to the CLEAR input line of the Break Flip-Flop 42. To clear the Occupy Flip-Flop 56, a line connects the RESUME signal thereto. As stated previously, each of the units is connected in sequence by a line existing between the Transmitter Inverter 48 of one unit and the Receiver Inverter 40 of the next unit. The Transmitter Inverter of the last unit in the sequence is coupled through a delay and inversion arrangement 60 to the input of Receiver Inverter 40 of the first unit.

Now that the structure of the embodiment has been described, its operation will be set forth. Initially, the input to Receiver Inverter 40 of Unit–1 is a logical "0." Consequently, a logical "1" is applied to the SET input line of Break Flip-Flop 42. The setting of Flip-Flop 42 results in a logical "1" being applied to Transmitter Inverter 48. Due to the double inversion involved in the interconnection of Inverter 48 with the Receiver Inverter 40 of the next unit, Unit–2, the Break Flip-Flop 42 of Unit–2 will be SET. This setting of the Break Flip-Flops proceeds through the entire system of interconnected units. If no Transmitter Terminal is waiting to transmit, the output from the last unit is a logical "0" which is reversed by the delay and inversion arrangement 60 to introduce a logical "1" to Receiver Inverter 40 of Unit–1. Consequently, the output of Inverter 44 becomes a logical "1" which completes the enabling of AND gate 46, which had already been partially enabled due to the fact that the Halt Flip-Flop 52 has remained cleared. Consequently, the Break Flip-Flop 42 is cleared and this operation proceeds for the remaining Break Flip-Flops of the system. Thus, it can be seen that the present embodiment is an oscillating circuit.

Assuming now that a Transmitter Terminal is desirous of having access to the channel, the operation of the circuit will be described. For purposes of illustration, Transmitter Terminal 1 will be considered as being ready to transmit. As the sequence of successive setting of Break Flip-Flops 42 begins, the setting of the Flip-Flop 42 of Unit–1 partially enables AND gate 50, which is further partially enabled by the NEED–1 signal. The effect of the setting of Flip-Flop 42 is not immediately appreciated at the third input to AND gate 50 due to the delay interposed between the CLEAR output line of Flip-Flop 42 and the gate. Thus, for a time determined by the length of this delay, gate 50 is enabled to apply a logical "1" to the SET input of the Halt Flip-Flop 52. The setting of the Flip-Flop 52 results in a partial enabling of AND gate 54 and the disabling of AND gate 46. Thus, the Break Flip-Flop 52 cannot be cleared for a reason which will shortly become apparent. The sequence of setting the Break Flip-Flop 42 of each unit continues, and for each unit where there is a NEED signal, the respective Halt Flip-Flop will be set. When the signal is returned from the last unit to the first, its inversion results in the application of a logical "1" to the input of Receiver Inverter 40 of Unit–1. The double inversion by Inverters 40 and 44 results in a logical "1" being applied to AND gate 54 thereby completely enabling same. The resultant output sets the Occupy Flip-Flop 56 to develop a READY–1 signal which is utilized to secure the channel for Transmitter Terminal 1. Since the SET condition of Halt Flip-Flop 52 prevents the Break Flip-Flop 42 from being cleared, logical "0's" are applied as inputs to the Receiver Inverters 40 of each of the subsequent units of the system. Thus, their respective Occupy Flip-Flops cannot be set. When transmission from Terminal 1 is completed, the RESUME signal clears Occupy Flip-Flop 56 of Unit–1 and partially enables AND gate 58. Due to the delay betwen the SET output line of Flip-Flop 56 and gate 58, the clearing of the former does not immediately affect the condition of gate 58, which is now enabled to clear the Halt Flip-Flop 52. As Flip-Flop 52 clears, AND gate 46 is conditioned to clear the Break Flip-Flop 42 so as to permit Transmitter Inverter 48 to pass a logical "1" to the next unit. This permit is rippled through the sytsem until a unit is reached which is waiting to transmit.

The description of the invention thus far has been concerned with the detailed structure of the scanning arrangements which form a principal aspect of the invention. However, it is important to appreciate that the invention is applicable to a great variety of modes of transmission and reception. The simplified example of FIGURE 1 has been included to facilitate understanding of the various embodiments of the scanning arrangements. However, wires, coaxial cables, transmission lines, light beams, radio microwaves, or subcarriers in any of the mediums could be utilized for transmission. For example, a convenient carrier might be one or two of many subcarriers in a FM/FM or FM/AM radio link, the remaining subcarriers of which are used as channels whose occupancies are shared asynchronously. In fact, a system in which only one subchannel carries address and data, possibly in serial sequenced form, is within the scope of this invention, even though attention is primarily directed toward multipath channels. The address/data link could even be shared with the Break-Permit signals in some cases by the use of distinctive signals or signal levels, as has been done for many years in the telephone industry for selective calling.

Figure 5:
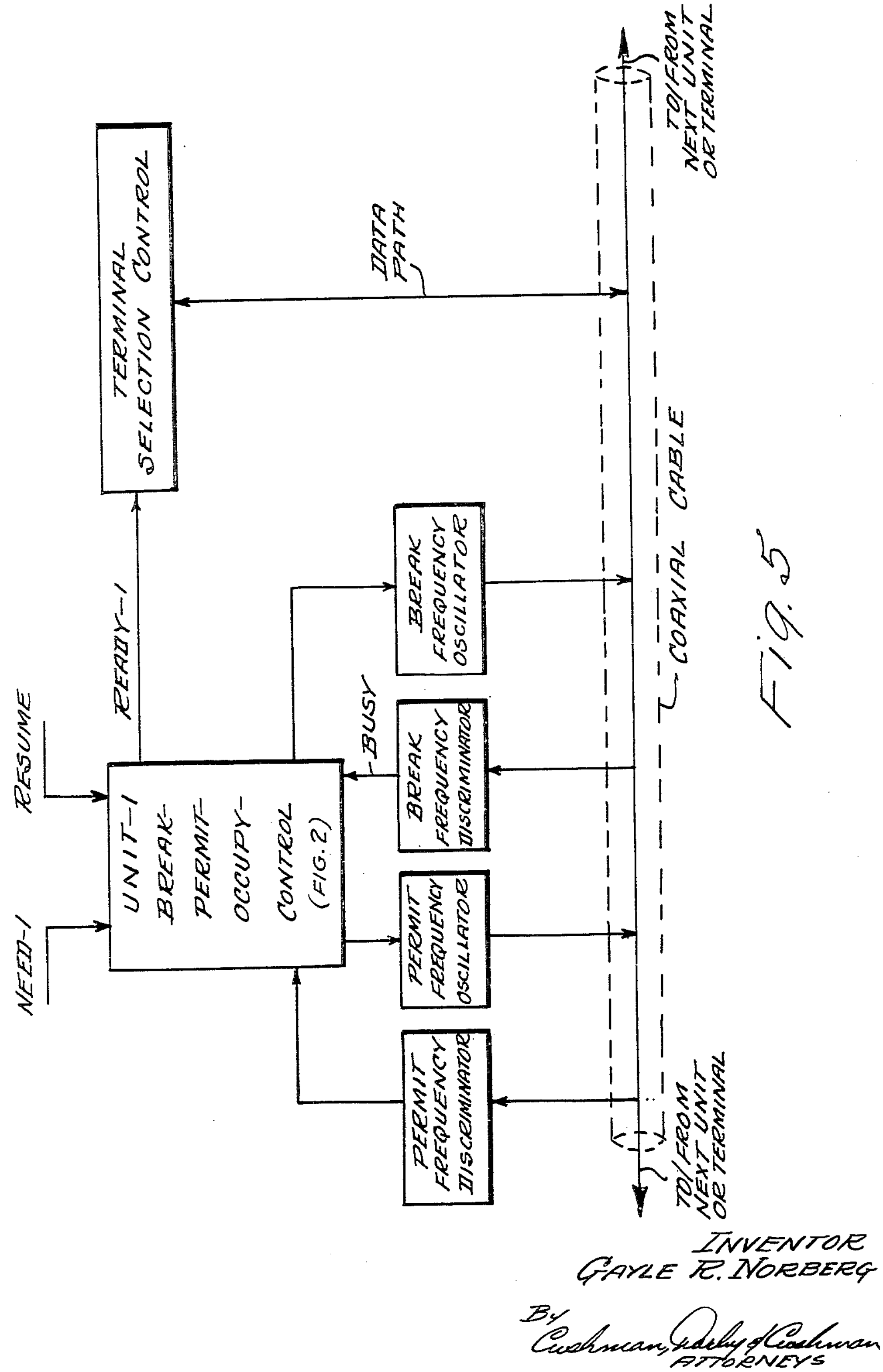
FIGURE 5 is a schematic block diagram of a further communication system with which the invention could be utilized.

In one such system, such as that shown in FIGURE 5, the Break signal could be a common distinctive tone or subcarrier generated by any of the Terminals, and the Permit signal could be a group of similar non-interfering tones or subcarriers, each generated by only one Terminal and recognizable only to the Terminal of next lower priority. Each Terminal would then pass the Permit sequentially to the next unit in line until the Breaking one halts its further progression.

Referring now more specifically to FIGURE 5, there is illustrated in block diagram form a Break-Permit-Occupy arrangement which corresponds to that of Unit-1 of FIGURE 2. A coaxial cable is shown as the transmission medium shared by the Terminals and the other units. Break and Permit communication is performed with fixed frequency signals and filters, or discriminators, to and from the coaxial cable. When a Break is to be registered, the Break Frequency Oscillator of the Breaking unit is turned on thereby sending a keying signal to the coaxial cable, and on to the other units. For each Transmitter Terminal, a Break Frequency Discriminator, tuned to pass the frequency of the Break Oscillator, is coupled to the cable. A Break signal from any Terminal will then deliver a Busy signal to each other unit. The Terminal with highest priority has a Permit Discriminator coupled to the cable and tuned to pass this Break Frequency. If that unit is not ready to transmit (does not have a NEED and is not Breaking), the Permit signal will pass through the unit to its corresponding Permit Frequency Oscillator. This Oscillator produces a signal of frequency recognized only by the Permit Frequency Discriminator of the unit of next lower priority. The Permit Discriminator of that unit is tuned to the frequency of the Permit signal of the first priority unit. The output of the second Permit Oscillator is tuned to the Permit Discriminator of the third-priority unit, and so on down the line. Priorities may be changed by simply changing the Permit signal oscillators and Frequency Discriminators.

The above-described embodiments are illustrative of preferred embodiments of the invention but are not intended to limit the possibilities of insuring the improved features of asynchronous time-sharing or multi-carrier channels achieved by the disclosed structure. The systems disclosed herein are examples of arrangements in which the inventive features of this disclosure may be utilized, and it will become apparent to one skilled in the art that certain modifications may be made within the spirit of the invention as defined by the appended claims.

What is claimed is:

1. Apparatus for asynchronously controlling access by individual ones of a plurality of terminals to a communication channel to permit selective transmission thereon, comprising:

(a) a plurality of control units each being associated with a separate one of said terminals;

(b) a control line joined in common to each of said units;

(c) each control unit including:

(1) first circuit means responsive to a control signal on said control line, and to a request for channel access from its terminal to change the condition of said control signal;

(2) second circuit means responsive to the operation of said first circuit means to prevent passage of said changed control signal to any of the other units;

(3) third circuit means responsive to the operation of said first circuit means and the changed control signal to generate an output signal from said unit for use in completing access of the respective terminal to the channel; and (4) fourth circuit means responsive to termination of transmission on the accessed channel and to the changed control signal to return said first circuit means and the control signal to their original conditions.

2. Apparatus according to claim 1 wherein said control unit further comprises:

fifth circuit means connected to the control line and operative to inhibit the generation of additional output signal by units of remaining terminals during the period that any terminal has access to the channel.

3. Apparatus according to claim 1, further comprising:

(a) a second control line coupled to the first circuit means of each of said units; and (b) fifth circuit means associated with each control unit and connected to the second control line to inhibit generation of additional output signals by units of remaining terminals during the period that any terminal has access to the channel.

4. Apparatus for asynchronously controlling access by individual ones of a plurality of terminals to a communication channel to permit selective transmission thereon, comprising:

(a) control unit means associated with each terminal and responsive to the need of that terminal for access to the channel;

(b) a first control line accessible commonly to all control units;

(c) transmitting means in each control unit connecting the unit to said first control line to signal any need for the channel;

(d) a second control line connected to said control units so as to allow a permit signal to pass successively from each unit in the system to the next;

(e) means in each control unit, selectively activated by the need of the associated terminal for access to the channel, to halt passage to the next unit of said permit signal on the second control line;

(f) means for connecting the first control line to the second control line so as to produce said permit signal on the second control line as a result of a signal being received on the first control line from said transmitting means; and (g) occupancy control means in each control unit, responsive to said permit signal and to the need of the corresponding terminal for access to the channel, to produce an output signal for use in completing access to the channel.

5. Apparatus according to claim 4, further comprising:

circuit means in each unit connected to the first control line, and responsive to the signal received from any of said transmitting means when a terminal indicates a need for the channel, to inhibit generation of additional output signals by units of remaining terminals while the channel is busy.

6. Apparatus according to claim 4, further comprising:

(a) a third control line accessible commonly to all control units;

(b) additional transmitting means in each control unit connecting the unit to said third control line and applying a signal to said line when the corresponding terminal needs the channel; and (c) circuit means in each unit connected to the third control line, and responsive to the signal received from any of said additional transmitting means, to inhibit generation of additional output signals by units of remaining terminals while the channel is busy.

7. Apparatus according to claim 6, wherein:

said additional transmitting means is connected to the output of said occupancy control means.

8. Apparatus according to claim 4, further comprising:

circuit means in each unit connected to the respective occupancy control means and passage halting means, and responsive to the completion of channel usage by the terminal associated with the particular unit, to terminate the output signal from the occupancy control means and to allow the permit signal to proceed to the next unit.

9. Apparatus for asynchronously controlling access by individual ones of a plurality of terminals to a communication channel to permit selective transmission thereon, comprising:

(a) a plurality of control units, each associated with a separate one of said terminals;

(b) a first control line portion joined in common to each of said units;

(c) circuit means associated with each of said control units and responsive to a signal from its respective terminal, when said terminal desires access to the channel, to generate a control signal which is applied to said first control line portion to prevent access selection by each of the other units;

(d) a second control line portion interconnected with said circuit means and said units to sequentially present said control signal to each of said units;

(e) additional circuitry associated with each of said control units and responsive to the operation of the first-mentioned circuit means of its respective unit, when the terminal desires access to the channel, to prevent a control signal on the second control line portion from passing to the next unit in the sequence;

(f) still further circuitry in each unit responsive to the control signal, when said signal is halted at the respective unit, to generate an output signal from said unit for use in completing access of the corresponding terminal to the channel; and (g) means responsive to the termination of transmission on the accessed channel to permit passage of said control signal to the next unit in sequence.

10. Apparatus according to claim 9, wherein said second control line portion is interconnected with the circuit means via said first control line portion.

References Cited

UNITED STATES PATENTS

| | | | |
|---|---|---|---|
| 2,731,622 | 1/1956 | Doremus et al. | 325—57 |
| 3,104,332 | 9/1963 | Yourke | 328—104 |

KATHLEEN H. CLAFFY, Primary Examiner

ALBERT B. KIMBALL, Jr., Assistant Examiner

U.S. Cl. X.R.

178—50; 325—57; 328—154; 340—147